US008650602B2

(12) United States Patent
Pond et al.

(10) Patent No.: US 8,650,602 B2
(45) Date of Patent: Feb. 11, 2014

(54) INPUT QUEUED CONTENT SWITCHING USING A PLAYLIST

(75) Inventors: Daniel Pond, Andover, MA (US); Thomas V. Radogna, Westboro, MA (US); Weidong Xu, Westford, MA (US); Qin-Fan Zhu, Acton, MA (US); Steve Branam, Ayer, MA (US); Craig Frink, Chelmsford, MA (US); Michael G. Hluchyj, Wellesley, MA (US); Santosh Krishnan, Windham, NH (US)

(73) Assignee: Akamai Technologies, Inc., Cambridge, MA (US)

( * ) Notice: Subject to any disclaimer, the term of this patent is extended or adjusted under 35 U.S.C. 154(b) by 419 days.

(21) Appl. No.: 12/395,503

(22) Filed: Feb. 27, 2009

(65) Prior Publication Data
US 2010/0223392 A1    Sep. 2, 2010

(51) Int. Cl.
*H04N 7/173*    (2011.01)

(52) U.S. Cl.
USPC ............... 725/93; 725/91; 725/92; 725/97

(58) Field of Classification Search
None
See application file for complete search history.

(56) References Cited

U.S. PATENT DOCUMENTS

| | | | |
|---|---|---|---|
| 5,424,770 A | 6/1995 | Schmelzer et al. | |
| 5,499,046 A | 3/1996 | Schiller et al. | |
| 5,534,944 A | 7/1996 | Egawa et al. | |
| 5,550,577 A | 8/1996 | Verbiest et al. | |
| 5,594,490 A | 1/1997 | Dawson et al. | |
| 5,805,804 A | 9/1998 | Laursen et al. | |
| 5,859,660 A * | 1/1999 | Perkins et al. | 725/32 |
| 5,878,220 A * | 3/1999 | Olkin et al. | 709/217 |
| 5,926,649 A * | 7/1999 | Ma et al. | 710/6 |
| 6,055,577 A | 4/2000 | Lee et al. | |
| 6,154,496 A | 11/2000 | Radha | |
| 6,401,126 B1 * | 6/2002 | Douceur et al. | 709/231 |
| 6,438,630 B1 | 8/2002 | DeMoney | |

(Continued)

FOREIGN PATENT DOCUMENTS

| | | |
|---|---|---|
| CA | 2 466 458 | 12/2004 |
| EP | 0 713 184 | 5/1996 |

(Continued)

OTHER PUBLICATIONS

Hurst et al., "MPEG SPLICING: Tutorial and Proposed SMPTE Standard," SMPTE Journal: pp. 1-14 (Nov. 1998).

(Continued)

*Primary Examiner* — Cai Chen
(74) *Attorney, Agent, or Firm* — Joshua T. Matt

(57) ABSTRACT

Described are computer-based methods and apparatuses, including computer program products, for input queued content switching using a playlist. A retrieval sequence is generated using a plurality of content requests based on content location information. A first portion of content is requested to be queued at a first content source, and a second portion of content is requested to be queued at a second content source. A content stream of the first portion and the second portion of content is generated using the retrieval sequence. The generating includes selecting the first portion of content from a queue associated with the first content source and transferring the first portion of content to an output buffer, then terminating transfer of the first portion of content and initiating transfer of the second portion of content from a queue associated with the second content source. The portion of content in the output buffer is transmitted to a client device.

20 Claims, 14 Drawing Sheets

(56) References Cited

U.S. PATENT DOCUMENTS

| | | |
|---|---|---|
| 6,480,539 B1 | 11/2002 | Ramaswamy |
| 6,567,471 B1 | 5/2003 | Yoshinari |
| 6,912,251 B1 | 6/2005 | Ward et al. |
| 6,937,770 B1 | 8/2005 | Oguz et al. |
| 6,944,585 B1 | 9/2005 | Pawson |
| 6,971,119 B1 | 11/2005 | Arsenault et al. |
| 7,107,309 B1 | 9/2006 | Geddes et al. |
| 7,502,368 B2 | 3/2009 | Sanders et al. |
| 7,561,515 B2 | 7/2009 | Ross |
| 2002/0013864 A1 | 1/2002 | Dandrea et al. |
| 2003/0208765 A1 | 11/2003 | Urdang et al. |
| 2004/0218617 A1 | 11/2004 | Sagfors |
| 2005/0188099 A1 | 8/2005 | Patel |
| 2005/0223107 A1 | 10/2005 | Mine et al. |
| 2005/0256873 A1 | 11/2005 | Walker et al. |
| 2005/0262536 A1* | 11/2005 | Urata et al. ............ 725/80 |
| 2006/0005224 A1* | 1/2006 | Dunning et al. ............ 725/115 |
| 2006/0161635 A1 | 7/2006 | Lamkin et al. |
| 2006/0165088 A1 | 7/2006 | Monta et al. |
| 2006/0230176 A1 | 10/2006 | Dacosta |
| 2006/0294555 A1 | 12/2006 | Xie |
| 2007/0055984 A1 | 3/2007 | Schiller et al. |
| 2007/0070895 A1* | 3/2007 | Narvaez ............ 370/230 |
| 2009/0083811 A1 | 3/2009 | Dolce et al. |
| 2009/0083813 A1 | 3/2009 | Dolce et al. |
| 2009/0180534 A1 | 7/2009 | Hluchyj et al. |
| 2009/0182843 A1 | 7/2009 | Hluchyj et al. |
| 2010/0010648 A1 | 1/2010 | Bull et al. |

FOREIGN PATENT DOCUMENTS

| | | |
|---|---|---|
| EP | 0 755 157 A2 | 1/1997 |
| EP | 0 805 593 | 11/1997 |
| EP | 1115252 A2 | 7/2001 |
| EP | 1 365 587 | 11/2003 |
| EP | 1655963 A2 | 5/2006 |
| EP | 1 675 399 | 6/2006 |
| EP | 1 755 339 | 2/2007 |
| WO | WO 98/54646 | 12/1998 |
| WO | WO 01/56285 | 8/2001 |
| WO | WO 02/08917 | 1/2002 |
| WO | WO 02/09425 A1 | 1/2002 |

OTHER PUBLICATIONS

ISO/IEC 13818-1: ITU-T Recommendation H.222.0: Series H: Audiovisual and Multimedia Systems: Infrastructure of Audiovisual Services—Transmission Multiplexing and Synchronization; Information Technology—Generic Coding of Moving Pictures and Associated Audio Information Systems: 1-171 (May 27, 1999).

SCTE 35 (ITU-T J.181) ANST/SCTE 35 2004: Digital Program Insertion Cueing Message for Cable, pp. 1-37 (2004).

Carretero, J., et al., "A hierarchical disk scheduler for multimedia systems," Future Generations Computer Systems, Elsevier Science Publisher. Amsterdam, NL, vol. 19, No. 1, Jan. 1, 2003, pp. 23-35.

Mourad, A., "Issues in the design of a storage server for video-on-demand," Multimedia Systems, ACM, New York, NY, US, 4:70-86 (1996).

Zhang, Y., et al., "Integrated Rate Control and Buffer Management for Scalable Video Streaming," *IEEE*, 248-251 (2007).

Zhang, Y., et al., "Joint Rate Allocation and Buffer Management for Robust Transmission of VBR Video," *Acta Automatica Sinica*, 34(3):337-343(2008).

Search Report for PCT counterpart application PCT/US2010/025218, issued Sep. 2, 2010, 3 pages.

Written Opinion for PCT counterpart application PCT/US2010/025218, issued Aug. 27, 2011, 5 pages.

* cited by examiner

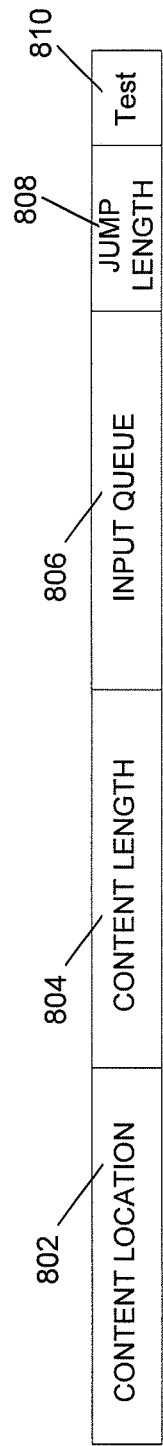
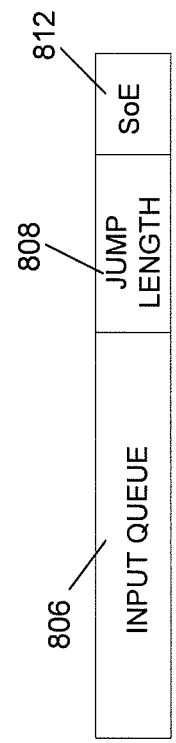
FIG. 8A
FIG. 8B

INPUT QUEUED CONTENT SWITCHING USING A PLAYLIST

FIELD OF THE INVENTION

The present invention relates generally to computer-based methods and apparatuses, including computer program products, for input queued content switching using a playlist.

BACKGROUND

Historically, video data is transmitted in the radio frequency (RF) spectrum to a television or set-top box (STB). For example, a Cable Head-End might use quadrature amplitude modulation (QAM) to transmit digital video to its subscribers by modulating the video onto an RF signal that is up-converted and transmitted in the analog RF spectrum. The modulated video is formatted using MPEG-2 Transport Streams (MPEG-2 TS), and each home's television or STB tunes to a particular RF channel to view a program. On-demand content might also be modulated onto a QAM, and the STB tunes to a particular channel to view a program that was requested. In this type of network, the live broadcast content and the on-demand content is combined at the RF plant using an RF combiner. Different QAM devices are also generally used for video and data over cable service interface specification (DOCSIS) data, and similarly combined at the RF plant (i.e., DOCSIS uses QAM channels that are not used for video broadcast).

Newer internet protocol television (IPTV) deployments wrap the video in a transport layer (e.g., real-time transport protocol (RTP), transmission control protocol (TCP), user datagram protocol (UDP)) and then transmit the content using either a multicast or unicast across an IP data network (e.g., DOCSIS, very high bitrate digital subscriber line (VDSL), gigabit passive optical network (GPON), Ethernet, etc.). The use of IP multicast is common for live broadcast channels viewed by many, since it is similar in concept to broadcast television. However, in this usage of multicast, only the IPTV subscribers that request to join a particular multicast session will actually receive the transmission. IP unicast, on the other hand, is used for on-demand content, with a unique IP address used per subscriber. Unicast enables per-subscriber customization of live content, such as when performing targeted advertising.

FIG. 1 shows a video delivery network 100 with different video delivery systems 108a-z, each connecting to clients 112a-z through a distribution network 110. Clients 112a-z are able to access each video delivery system 108a-z through this network 100, as well as content available from the IP core network 106.

Content is ingested by each video delivery system 108a-z, typically from an IP network 106. For example, IP multicast may be used for broadcast television retrieved from a broadcast television encoder 102, while IP unicast is used for on-demand content retrieved from a content origin server 104. Content may be ingested and delivered using different protocols. For example, File Transfer Protocol (FTP), TCP and Hypertext Transfer Protocol (HTTP) may be used for content ingest, while RTP, UDP, TCP, and HTTP may be used for delivery. TCP and HTTP are beneficial for delivery across IP data networks, since they are reliable and support bursting of data (e.g., progressive download to a STB or personal computer (PC)).

Clients 112a-z (e.g., STB, PC) interact (e.g., using Real Time Streaming Protocol (RTSP), HTTP, etc.) with a video delivery system 108a-z by making content requests. A signaling session is set up between the client 112a-z and the video delivery system 108a-z, and requests for content are made by the client 112a-z. This includes, for example, picking titles and channel changing for live content, as well as pause, rewind, fast forward, play, etc., for stored content. Once a video delivery system 108a-z has established a signaling session with a client 112a-z, some video delivery systems 108a-z will provide a proxy function to maintain the session when the requested content is available elsewhere in the network (i.e., a local cache "miss"). In this case, the system 108a-z makes the content appear as though it had originated locally, even though coming from another device in the network. Implementing the proxy function may also require a gateway between different protocol sessions (e.g., fetching content using HTTP and delivering content using UDP). In some cases, a redirect is performed, creating a new session with another system 108a-z containing the desired content.

For stored content delivery, a video delivery system (e.g., 108z) may use a playlist to access the stored content. For example, this might be used for playing a sequence of chapters in a movie. A playlist is any ordered list of content or references to content that can be accessed and played over a given time period. A playlist may be a list of songs, videos, multimedia, or other content. Playlists have long been used for music, e.g., dating back to radio broadcasting and, more recently, for multimedia content that can be played on a PC. Typically, a playlist is constructed with multiple references to one or more pieces of content, starting at the beginning and continuing until the end is reached. Playlists have many formats and are used in many different applications, including computerized media players, e.g., Windows Media Player from Microsoft Corporation of Redmond, Wash., or Adobe Flash Player from Adobe Corporation of San Jose, Calif., among others. Typically, a playlist is executed by retrieving the media data (from local storage, network storage, etc.) and running a program that actually plays the media. Often, the stored media is in a compressed format (e.g., MPEG-2, Advanced Video Coding (AVC), MPEG-1 Audio Layer 3 (MP3), VC-1, etc) and the program that plays the content decodes the media before presenting it.

At times, subscribers may want to switch between different types of content (e.g., from a live broadcast to on-demand programming). Content switching is generally performed between different systems, resulting in new sessions being created at each content switch. This generally includes switching between live and stored content, such as between broadcast television and timeshift TV, as well as to proxy content that is fetched from elsewhere in the network. A video delivery system (e.g., 108a) connected to a client (e.g., 112a) via a signaling session may be capable of supporting live television broadcast delivery as well as stored content delivery (e.g., Video On-Demand (VoD), Timeshift TV, Network Personal Video Recorder (nPVR)). However, it is more often that different video delivery systems 108a-z will be used for different applications, such as one for live content delivery 108a (e.g., fast channel change) and another for stored content delivery 108z. Having different systems 108a-z for each type of content delivery requires creating a new session between the client 112a-z and each video delivery system 108a-z at each content switch. For example, a subscriber at client 112a may be watching live television and then select a time-shifted version of the same program. If the live content is provided by one system (e.g., 108a) and the stored timeshift TV content is provided by another system (e.g., 108z), then a new signaling session is needed between the client 112a and the timeshift system 108z. This process may take several seconds to complete, since one session is taken down and another is created, and typically involves another application on another system that then directs where the content session requests should be made.

Content switching may also include fetching proxy content that is stored elsewhere in the network 100. In a system 108a-z that is capable of single session proxy, where the proxy content being delivered is consistent with any locally served content, access requests to the proxy content may be included in a playlist. The proxy content may be available in the same protocol as what is being delivered, or the content may be available in a different protocol. If the content is available in the same protocol, a Network Address Translation (NAT)-like function (UDP in and UDP out) may be performed. If the content is available in a different protocol, a more sophisticated gateway function may be needed to convert between protocols (e.g., HTTP to UDP). Typically, the video delivery system 108a-z will conduct this conversion by ingesting the proxy content, storing it locally, and then delivering it to a client 112a-z as stored content. Depending on the caching effectiveness of the system 108a-z, this may require significant ingest and storage bandwidth.

Playlists may be used to control content switching between different content sources, even when the sources have different access latency. For example, a switch between a live broadcast television program, stored content, and proxy content stored elsewhere in the network may be done, although each switch may complete at a different time. This is due to each content type potentially having a different access delay. A seamless content switch requires each content type be available at a precise time so there are no gaps in the resulting output stream and no overlap of content.

Another example of content switching occurs in the context of advertisement (ad) splicing in live broadcast streams. Ad splicing is a common function supported by a video delivery system 108a-z. Spliced advertisements may be stored on the video delivery system 108a-z performing the splice or on an ad server (not shown). When a splice is to be performed, a splice point is often indicated in the live video stream. The system 108a-z performing the splice has a fixed window of time to fetch the ad and perform the splice (e.g., four-second countdown that is signaled in live broadcast feed). If the ad is available in time, then a switch is made between the live stream and the ad stream being read from storage. If the ad cannot be fetched quickly enough, then the splice is aborted and the live broadcast continues unchanged, since there is typically a default ad already in the spot. This is possible since the splicer generally has access to both input streams simultaneously, and can choose in real-time which to deliver as its output.

An input queued system may have many queues with content available for writing to an output buffer. A priority or fairness algorithm can be used to determine which input queue to read from as there is space available in an output buffer. Generally, content that is part of the same flow and read from different input queues requires some means to reorder the content before delivery, increasing complexity and the amount of bandwidth required at the output buffer. When input queues are used for content switching, controlling the order in which the input queues are accessed is essential to composing an output stream in the output buffer, and further reducing the output buffer bandwidth and complexity. By insuring that there are no gaps or overlap in input queue access, the output buffer input bandwidth may be matched to its output bandwidth and be written in first-in first-out ("FIFO") order.

Controlling the precise time for input queue selection, when performing content switching, requires a mechanism to synchronize the input queue access with the actual content. For example, a seamless content switch may require two pieces of content be spliced back to back in an MPEG-2 TS compliant manner. This would be needed to avoid display artifacts that might occur from a partially constructed output stream. The input queue selection may be done based on time if the system is precise enough, e.g., switch at 12 o'clock, based on a content data length if this is known before hand, e.g., switch after 1,000 bytes, and by examining the content stream if a command can be issued at the appropriate time, e.g., look for the next video out-point and then switch. These approaches each have issues, since it is not always known when a content switch must occur, for example, when performing an ad splice.

Content switching in a system with variable latency may require a means to handle cases where the content cannot be accessed at the needed time. A system using a playlist and issuing multiple commands in the playlist in parallel has an expectation that the commands will be fulfilled in time. If a command in the playlist cannot be completed because the content is unavailable, then an error may be signaled and an interruption in content delivery may occur. For example, a playlist is constructed ahead of time in the splicing countdown window of a live stream so an advertisement can be pre-fetched and then inserted when the splicing point is reached. Since the playlist is generated ahead of knowing whether the content read will succeed or not, any content switch to content that is unavailable causes reading of the live stream to stop, and no content to be sent to a client. In the case of an advertisement being unavailable for delivery, this may result in one or more freeze frames, as well as display and audio artifacts that are undesirable, until the system recovers. This may take several seconds, especially if the playlist is aborted and a new playlist must be created for new content.

A scalable system must support many content streams in parallel. Each stream may have different attributes and different access patterns. Keeping each stream's content requests separate from others is essential to scale and uniform content delivery (i.e., no gaps, skipped play, etc).

SUMMARY OF THE INVENTION

The techniques described herein include methods and apparatuses for input queued content switching using a playlist. The techniques combine live and stored content delivery, along with proxy content delivery from another source, and support content switching between different content types in a single client session. The transition between content can also be made seamless with respect to MPEG TS compliance.

In one aspect, there is a computerized method. The method includes generating, by a first computing device, a retrieval sequence using a plurality of content requests, the content requests being based on content location information. The method includes requesting a first portion of content to be queued at a first content source and a second portion of content to be queued at a second content source using the retrieval sequence. The method includes generating, at the first computing device, a content stream of the first portion of content and the second portion of content. The generating a content stream includes selecting the first portion of content from a queue associated with the first content source using the retrieval sequence. The generating a content stream includes transferring the first portion of content from the queue associated with the first content source to an output buffer. The generating a content stream includes terminating transfer of the first portion of content from the queue associated with the first content source to the output buffer, and initiating transfer of the second portion of content from a queue associated with the second content source to the output buffer, by selecting the second portion of content from the queue associated with the second content source using the retrieval sequence. The method includes transmitting the portion of content in the output buffer to a client device.

In another aspect, there is a computer program product. The computer program product is tangibly embodied in a machine-readable storage device. The computer program product includes instructions being operable to cause a data processing apparatus to generate, by a first computing device, a retrieval sequence using a plurality of content requests, the content requests being based on content location information. The computer program product includes instructions being operable to cause a data programming apparatus to request a first portion of content to be queued at a first content source and a second portion of content to be queued at a second content source using the retrieval sequence. The computer program product includes instructions being operable to cause a data programming apparatus to generate, at the first computing device, a content stream of the first portion of content and the second portion of content. The generating a content stream includes selecting the first portion of content from a queue associated with the first content source using the retrieval sequence. The generating a content stream includes transferring the first portion of content from the queue associated with the first content source to an output buffer. The generating a content stream includes terminating transfer of the first portion of content from the queue associated with the first content source to the output buffer, and initiating transfer of the second portion of content from a queue associated with the second content source to the output buffer, by selecting the second portion of content from the queue associated with the second content source using the retrieval sequence. The computer program product includes instructions being operable to cause a data programming apparatus to transmit the portion of content in the output buffer to a client device.

In another aspect, there is a system for input queued content switching. The system includes a content request processor configured to generate, by a first computing device, a retrieval sequence using a plurality of content requests, the content requests being based on content location information. The content request processor is configured to request a first portion of content to be queued at a first content source and a second portion of content to be queued at a second content source using the retrieval sequence. The system includes a content retrieval processor configured to generate, at the first computing device, a content stream of the first portion of content and the second portion of content. The generating a content stream includes selecting the first portion of content from a queue associated with the first content source using the retrieval sequence. The generating a content stream includes transferring the first portion of content from the queue associated with the first content source to an output buffer. The generating a content stream includes terminating transfer of the first portion of content from the queue associated with the first content source to the output buffer, and initiating transfer of the second portion of content from a queue associated with the second content source to the output buffer, by selecting the second portion of content from the queue associated with the second content source using the retrieval sequence. The content retrieval processor is configured to transmit the portion of content in the output buffer to a client device.

In another aspect, there is a system for input queued content switching. The system includes means for generating, by a first computing device, a retrieval sequence using a plurality of content requests, the content requests being based on content location information. The system includes means for requesting a first portion of content to be queued at a first content source and a second portion of content to be queued at a second content source using the retrieval sequence. The system includes means for generating, at the first computing device, a content stream of the first portion of content and the second portion of content. The generating a content stream includes selecting the first portion of content from a queue associated with the first content source using the retrieval sequence. The generating a content stream includes transferring the first portion of content from the queue associated with the first content source to an output buffer. The generating a content stream includes terminating transfer of the first portion of content from the queue associated with the first content source to the output buffer, and initiating transfer of the second portion of content from a queue associated with the second content source to the output buffer, by selecting the second portion of content from the queue associated with the second content source using the retrieval sequence. The system includes means for transmitting the portion of content in the output buffer to a client device.

In some examples, any of the aspects can include one or more of the following features. The generating a retrieval sequence includes generating a plurality of retrieval entries based on each content request and inserting the retrieval entries into the retrieval sequence. The generating a retrieval sequence can further include determining a content access delay for each retrieval entry and determining a content request time based on the content access delay. The content request time can be based on a content type, a content length, a content source, a temporal value, or any combination thereof.

In other examples, the requesting first and second portions of content includes sending a first content retrieval request to the first content source and a second content retrieval request to a second content source. The first content source and the second content source can be of type transient buffer, persistent storage, network-based, or any combination thereof.

In some examples, the selecting the second portion of content includes selecting a substitute portion of content from a queue associated with a third content source based on the retrieval sequence wherein the second portion of content is unavailable in the queue associated with the second content source. The first content source and the third content source can be the same.

In other examples, the content requests are based on session control information. The content requests can be based on a request from a client device. The transferred portion of content can be processed to determine the existence of an indicator. Control information can be inserted into the output buffer based on the indicator.

In some examples, the content location information includes a primary content source, a proxy content source, or any combination thereof. The output buffer can be a first-in first-out buffer. The output buffer can include content delivery processing.

In other examples, the first content source, the second content source, and the first computing device are connected by a switch fabric. The retrieval sequence can be a data structure.

Any of the examples described herein can include one or more of the following advantages. The techniques, including methods, apparatuses, and computer program products, provide for live and stored content delivery in a single system, as well as proxy from another source, and therefore can support content switching between different content types in a single client session. The original signaling session can be retained even when switching between different content types. The transition between applications can also be made seamless with respect to MPEG TS compliance. The techniques employ an input queued system and a playlist to control the manner in which content is accessed. The playlist determines which content to access in sequence, the location of the content, the amount of content to read, and the input queue in which to store the content. Any difference in access latency between content types is hidden by issuing read commands far enough in advance of needing the content so that the input queue contains some or all of the requested content. Any access overlap between different content types is hidden since input queues may be written concurrently.

The techniques take advantage of the attributes of a playlist to control precisely the sequence of input queues that are accessed when performing content switching, as well as controlling the time at which a switch between input queues is made to compose an output stream in an output buffer. The precise timing of access eliminates any potential of content overlap, thereby reducing the bandwidth requirement of the output buffer and any complexity that might be associated with receiving content that is out of order. The size of the output buffer is also reduced, since the content is read slightly in advance of delivery, and no extra storage is needed for overlapped content accesses. The techniques use a separate playlist and output buffer for each delivered content stream. Each playlist may be executed at different times, according to the availability of content and when there is room available in the output buffer. This can avoid any head of line blocking.

The techniques utilize a playlist to access proxy content. By issuing the commands sufficiently in advance of needing the content, the techniques allow for storing the proxy to an input queue, so that the input queue selection can be performed similar to locally accessed content, and allow sending the proxy directly to a delivery output buffer without requiring the proxy content be stored first. This removes any storage bandwidth considerations from limiting the amount of proxy content that can be delivered by the system.

BRIEF DESCRIPTION OF THE DRAWINGS

The foregoing and other objects, features and advantages of the present invention, as well as the invention itself, will be more fully understood from the following description of various embodiments, when read together with the accompanying drawings.

FIG. 8A is a diagram of an exemplary content request format.

FIG. 8B is a diagram of an exemplary content retrieval request format.

DETAILED DESCRIPTION

In general overview, the described techniques include methods and apparatuses that are for input queued content switching using a playlist. The techniques are related to switching between live and stored content in order to create a content stream for delivery to a client device. The techniques achieve efficient transition between multiple content types by utilizing input queued functionality and a playlist to control the manner in which content is accessed. The playlist determines which content to access in sequence, the location of the content, the amount of content to read, and the input queue in which to store the content. Once the content is queued, these techniques make retrieval, buffering and delivery of the content more efficient by selecting portions of content according to the playlist sequence, thereby reducing the bandwidth requirements of the delivery module and output buffer.

Figure 1:
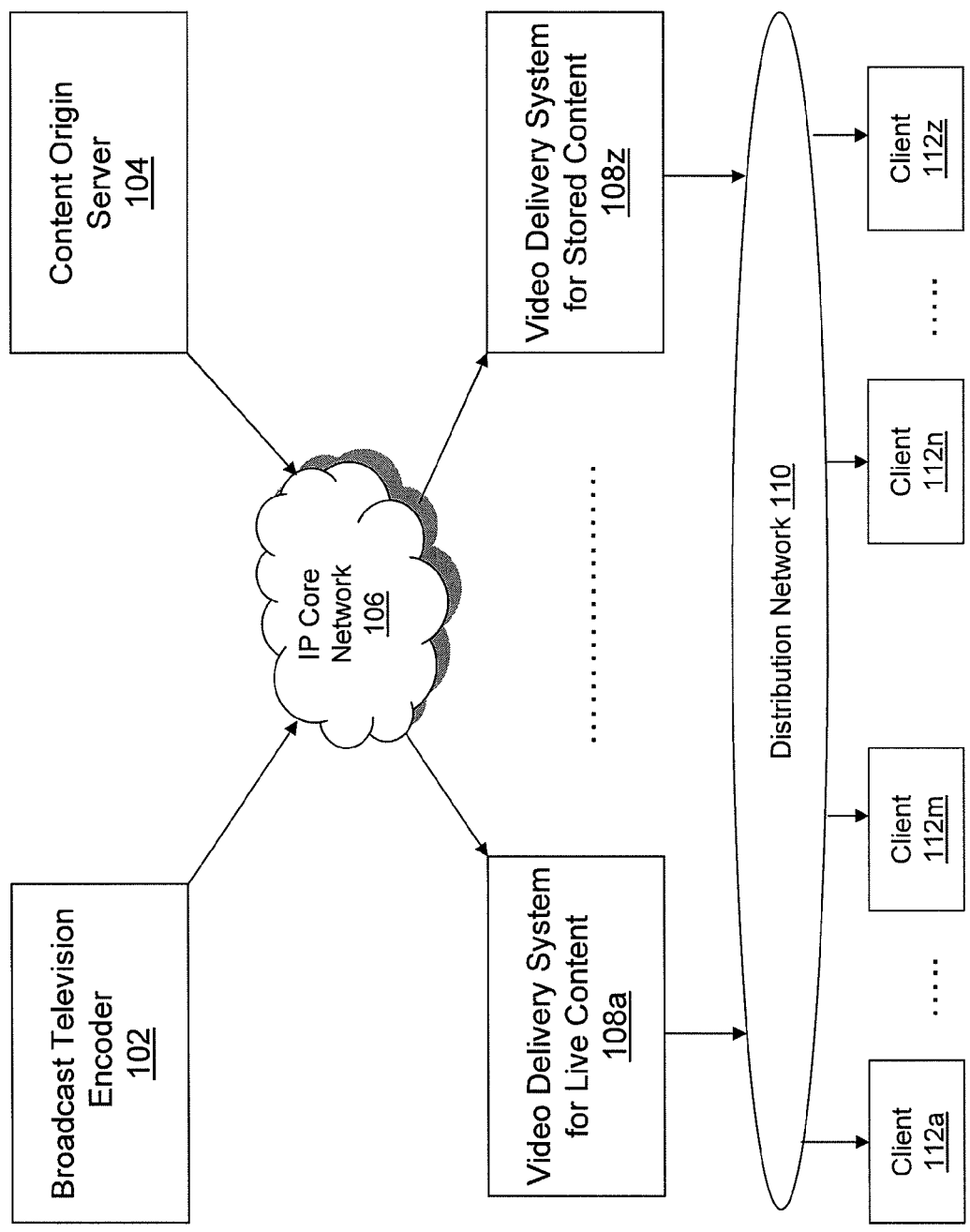
FIG. 1 is a depiction of a video delivery network, as illustrated in the prior art.
Figure 2:
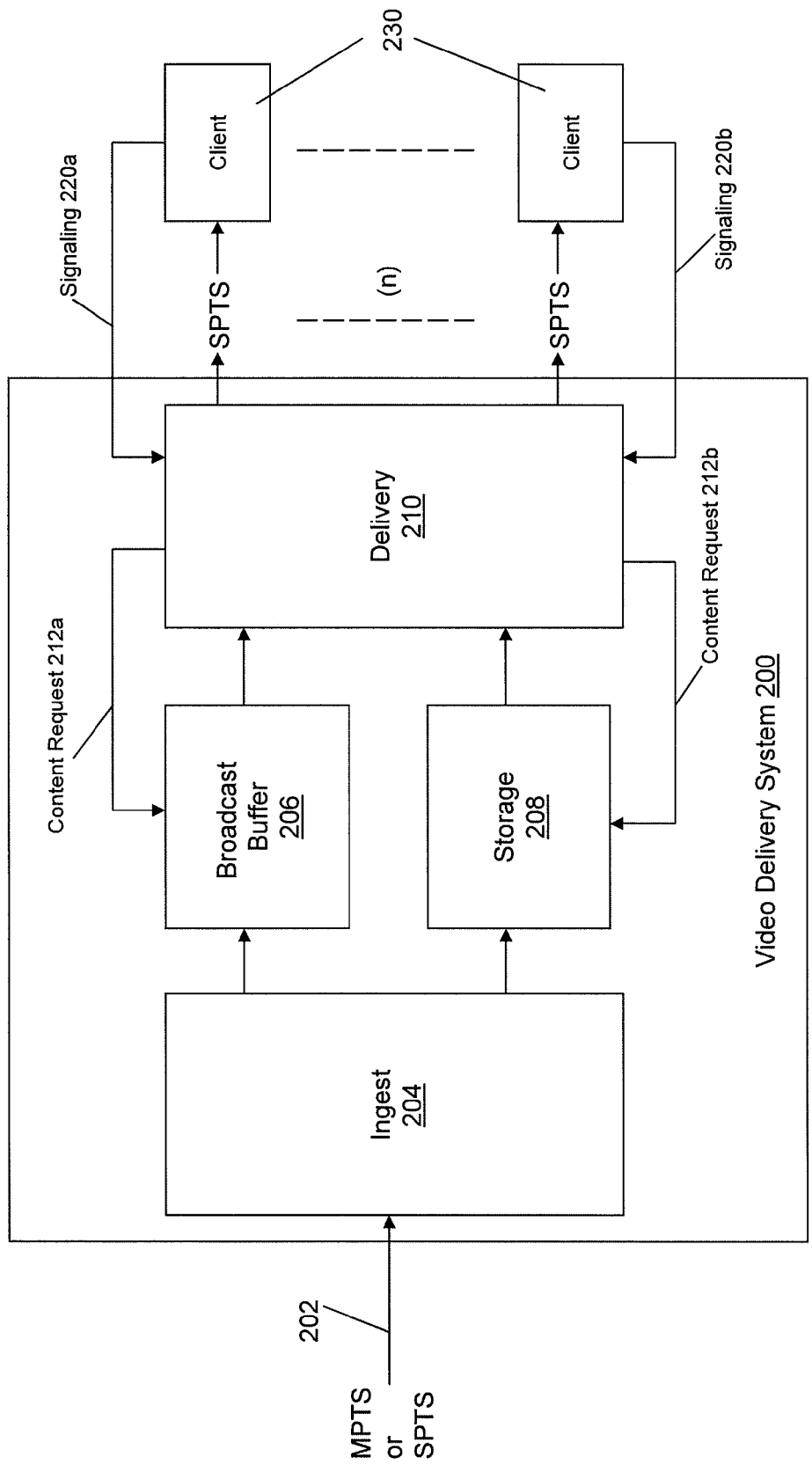
FIG. 2 is a block diagram of an exemplary system for video delivery.

FIG. 2 is a block diagram of an exemplary video delivery system 200. The video delivery system 200 is capable of content switching between live and stored content. The system 200 includes an ingest module 204, a broadcast buffer module 206 (e.g., DRAM), a storage module 208 (e.g., Flash memory), and a delivery module 210. The functions of the respective modules 204, 206, 208, and 210 may be integrated together or be kept separate. The ingest module 204 receives network packets 202 (for example, video streams such as MPTS, SPTS, or other content formats) over a communications network, processes the content as necessary, and then stores the content in the broadcast buffer module 206 or in the storage module 208. Live video may be written to the broadcast buffer module 206 for near instant access, such as for fast channel change (e.g., using a memory), as well as to storage (e.g., timeshift TV). The delivery module 210 reads the content from the broadcast buffer module 206 or the storage module 208, and transmits the read content to clients 230 (e.g., STB, PC, etc) across a communications network. The delivery module 210 also provides a signaling interface (e.g., signaling links 220a and 220b) between the video delivery system 200 and clients 230 in order for clients 230 to request access to content from the video delivery system 200. The video delivery system 200 supports constant bit-rate (CBR) and variable bit-rate (VBR) ingest and delivery, as well as multi-protocol ingest and delivery (e.g., RTP, UDP, TCP, HTTP, etc.).

Figure 3:
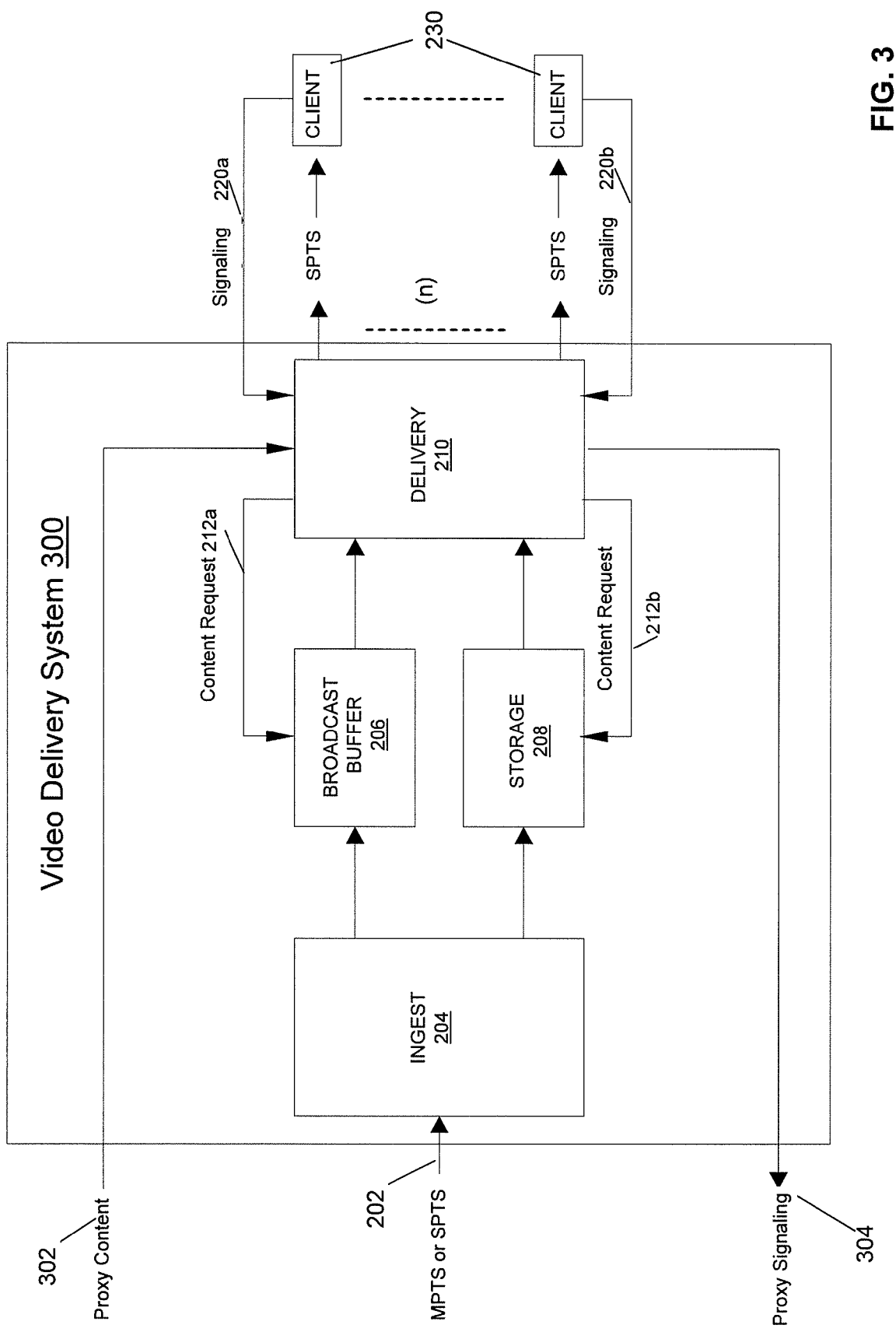
FIG. 3 is a block diagram of an exemplary system for video delivery that includes proxy content delivery.

FIG. 3 is a block diagram of a video delivery system 300 that includes proxy content delivery. In addition to supporting content delivery from the broadcast buffer module 206 and the storage module 208, the video delivery system 300 also supports proxy content delivery to a client device 230. The video delivery system 300 can fetch the proxy content 302 from another content source on the network by using signaling 304 to communicate with the content source. Typically, the video delivery system 300 fetches content 302 from a proxy content source when a local cache miss occurs (e.g., if the requested content is unavailable in the broadcast buffer module 206 or the storage module 208). The proxy content delivery can occur in a single session. When the video delivery system 300 retrieves the proxy content 302, the system 300 provides the content 302 to the delivery module 210 for transmission to a client device 230 without first needing that content to be stored in, for example, the broadcast buffer module 206 or the storage module 208. The delivery module 210 and the network proxy device (not shown) supplying the proxy content provide any signaling 304 that is necessary to retrieve the content 302. This makes the full delivery bandwidth available for proxy, and any scheduling of proxy content 302 may further be performed by the delivery module 210.

Figure 4:
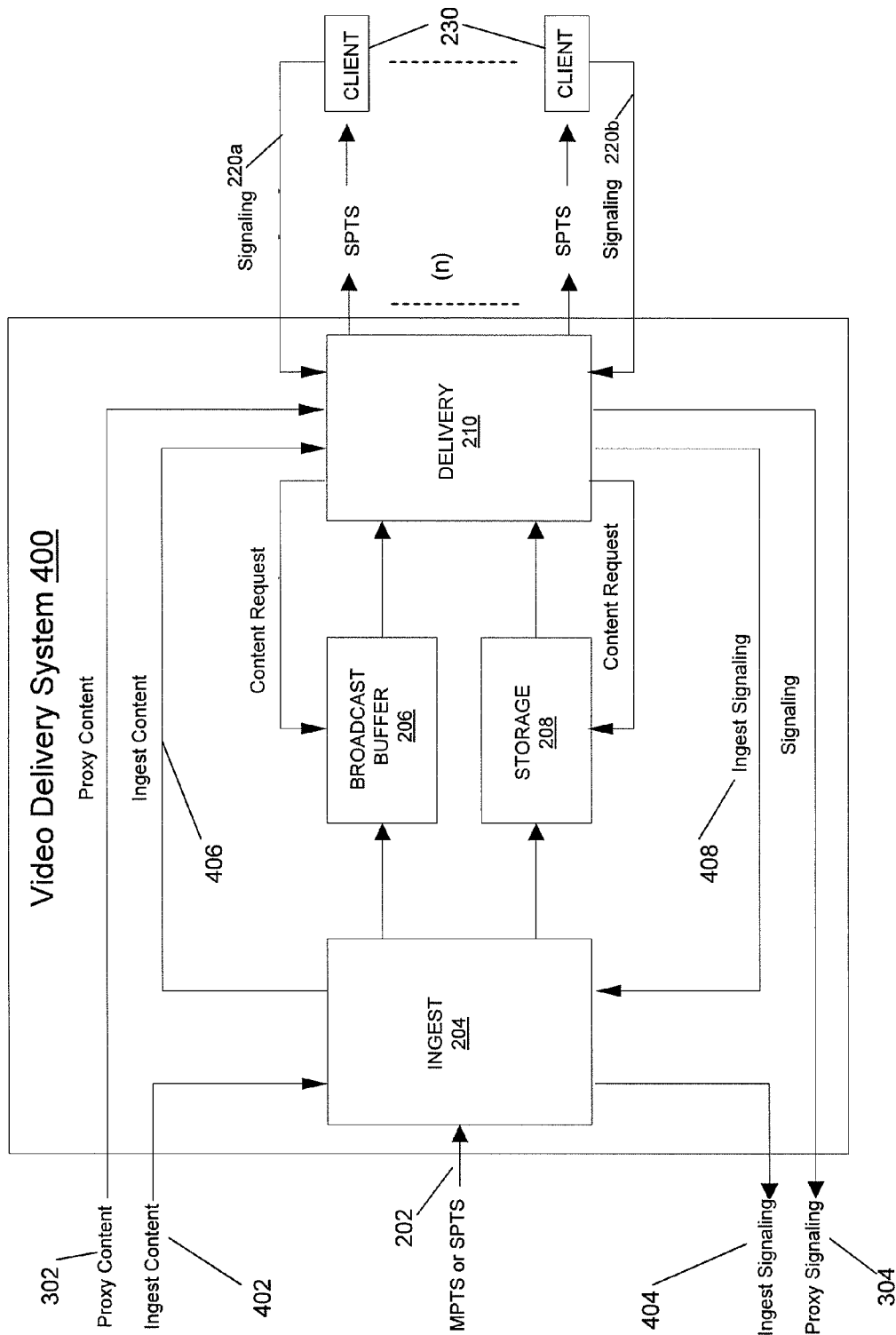
FIG. 4 is a block diagram of an exemplary system for video delivery that includes content ingest processing for proxy content delivery.

FIG. 4 is a block diagram of an exemplary system 400 for video delivery that includes content ingest processing for proxy content delivery. In some cases, it may be necessary to receive proxy content 402 at the ingest module 204, process the proxy content 402, and then make the proxy content 402 available to the delivery module 210 for transmission to a client device 230, again without storing the content. The ingest module 204 creates a signaling session 404 (e.g., HTTP, TCP, etc.) between the video delivery system 400 and the proxy system providing the content 402. The ingest module 204 receives the proxy network packets (e.g., over Ethernet) and processes them as needed, and then makes the content 402 available to the delivery module 210 for transmission to a client device 230. The delivery module 210 continues to manage the signaling interface between the video delivery system 400 and the client device 230, such that the client device 230 is unaware that the content 402 was sourced from an entity other than the video delivery system 400.

Figure 5:
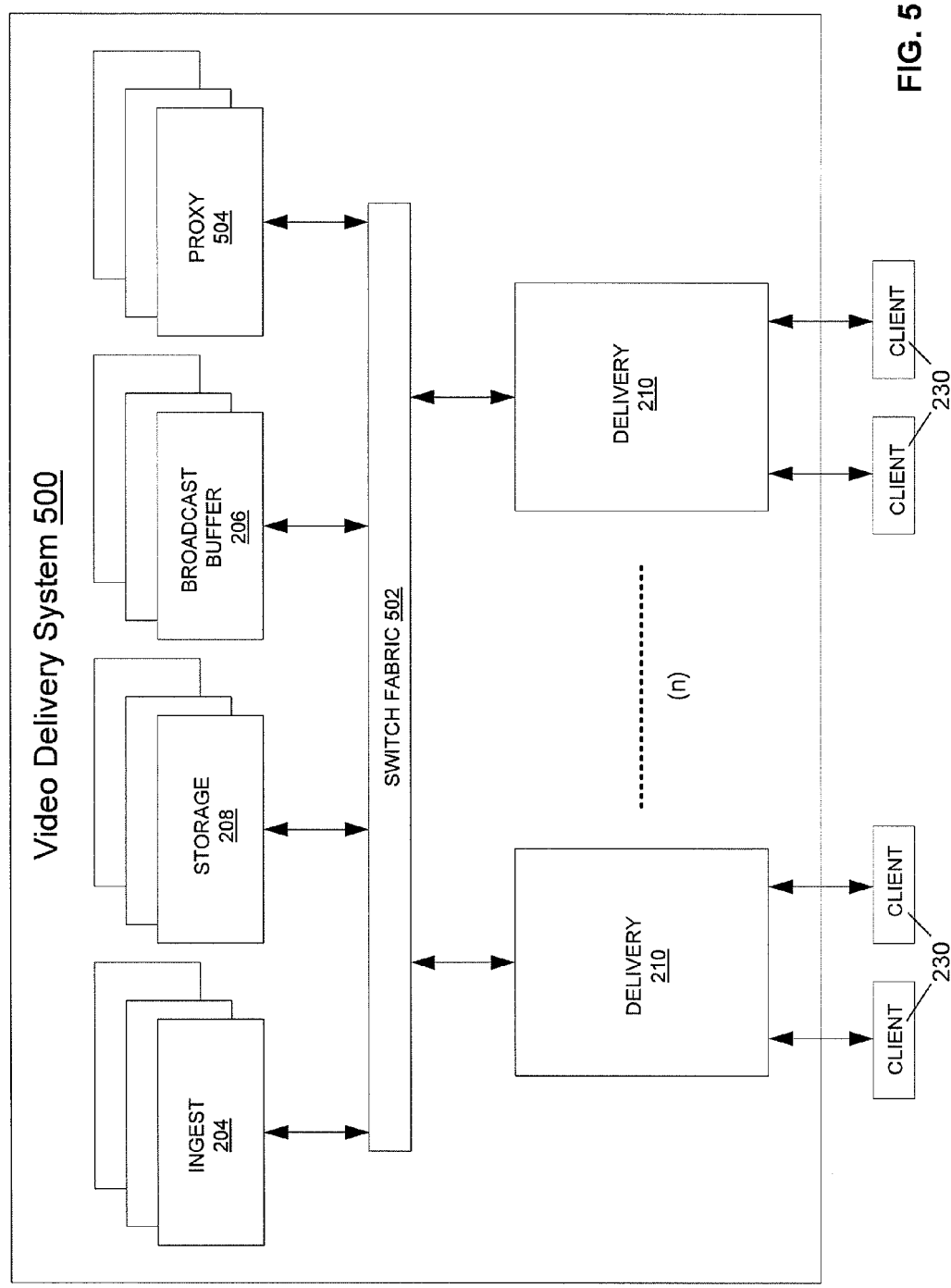
FIG. 5 is a block diagram of an exemplary system for video delivery that includes the components connected through a switch fabric.

FIG. 5 is a block diagram of an exemplary system 500 for video delivery that includes the components 204, 206, 208, and 210 connected through a switch fabric 502. In order to provide connectivity between each of the functions involved in the process of ingesting, storing, proxy, and delivery of content on a large scale, the ingest module 204, the broadcast buffer module 206, the storage module 208, and the proxy content source are all connected to the delivery module 210 and to each other via a switch fabric 502. The switch fabric 502 can be lossless. The switch fabric 502 provides a connection between (n) outputs and (m) inputs simultaneously (where n can be less than, equal to, or greater than m) in a non-blocking fashion, meaning that for each output a connection to an input can be made without interference from other outputs or inputs. The switch fabric 502 may be comprised from a single switch supporting bidirectional connectivity, a separate switch for each connection direction, as well as separate switch types, e.g., one for switching content and another for switching network packets. Multiple other configurations are also possible (e.g., dual star, full mesh, crossbar, etc).

The switch fabric 502 provides connectivity between each of the respective modules 204, 206, 208, and 210, for example, to ingest content at the ingest module 204 from a proxy device interface 504. In one embodiment, the ingest module 204 may contain a direct connection (not shown) to a proxy device interface 504 to conserve switch fabric bandwidth, or receive its content from a proxy device interface 504 that is attached to the switch fabric 502. The delivery module 210 may also provide a direct connection (not shown) to a proxy device interface 504 to reduce the bandwidth requirement of the switch fabric 502. In doing so, content can be read from the storage module 208, the broadcast buffer module 206, and the proxy device interface 504 by the delivery module 210 and then be sent directly to a network, typically one facing a client device 230 (although this is not necessary), without needing to traverse the switch fabric 502 a second time. Each of the respective modules may itself be comprised from multiple components or devices, such as having several proxy device interfaces 504, storage modules 208, broadcast buffers 206, and ingest devices 210.

Figure 6:
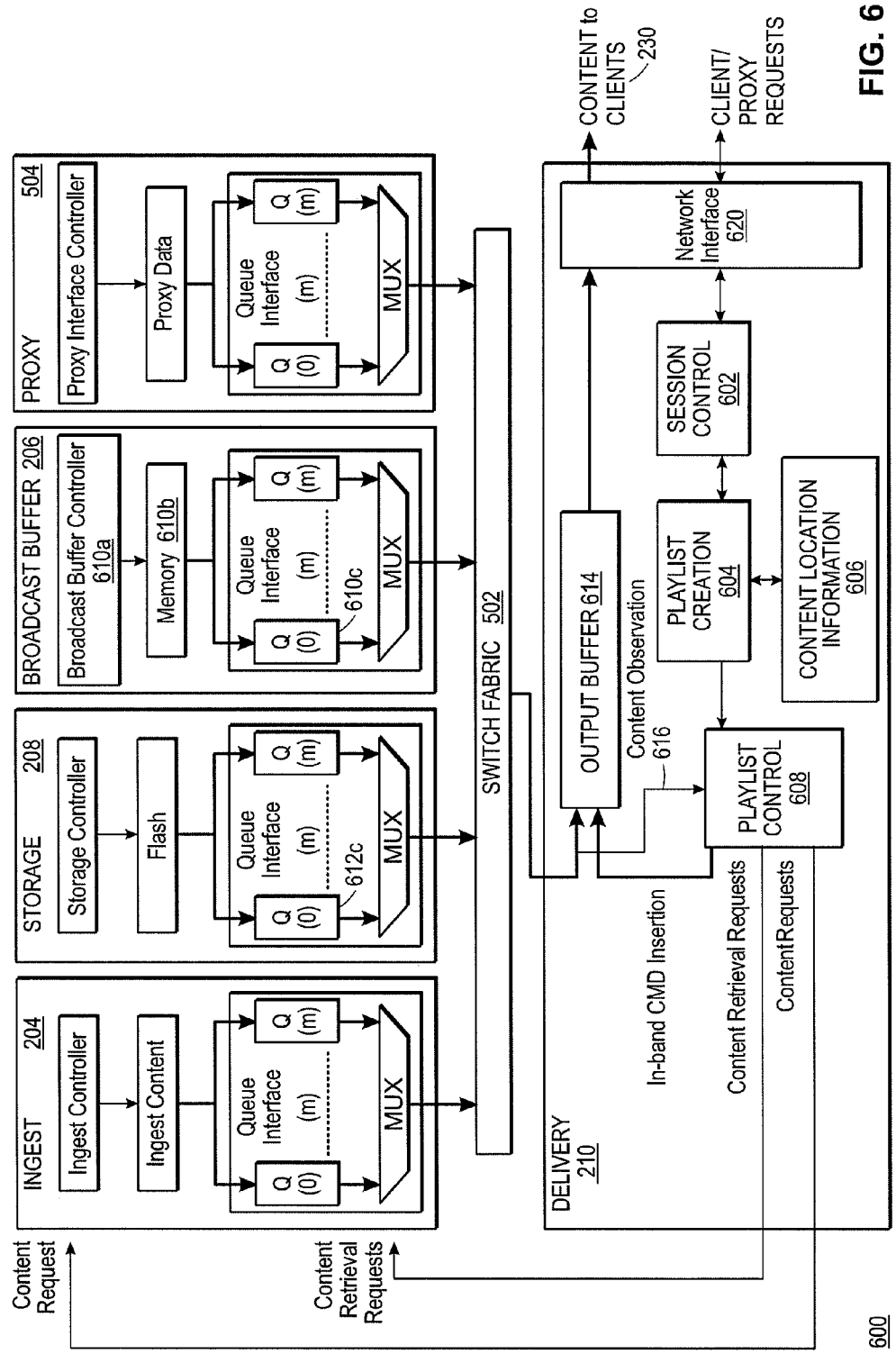
FIG. 6 is a block diagram of an exemplary system and method for input queued content switching using a playlist.

FIG. 6 is a block diagram of an exemplary system 600 for input queued content switching using a playlist. The system 600 includes an ingest module 204, a broadcast buffer module 206, a storage module 208, and a proxy device interface 504, all connected via a switch fabric 502 to a delivery module 210. The delivery module 210 is connected to a network interface 620 to communicate with client devices 230. Each of the modules 204, 206, 208 and 504 include a controller (e.g., Ingest Controller, Storage Controller, Broadcast Buffer Controller, Proxy Interface Controller) to receive content requests from the delivery module 210, a content storage medium (e.g., Ingest Content, Flash, Memory, Proxy Data) for storing content, and a queue interface for making content available to the delivery module 210. Each of the respective queue interfaces can include one or more input queues to hold content. The delivery module 210 includes a session control module 602, a playlist creation module 604, a content location information module 606, a playlist control module 608, and an output buffer 614. The output buffer 614 communicates with a network interface 620 to transmit content to client devices 230. The delivery module 210 also includes a content observation link 616 between the playlist control module 608 and the output buffer 614.

Figure 7:
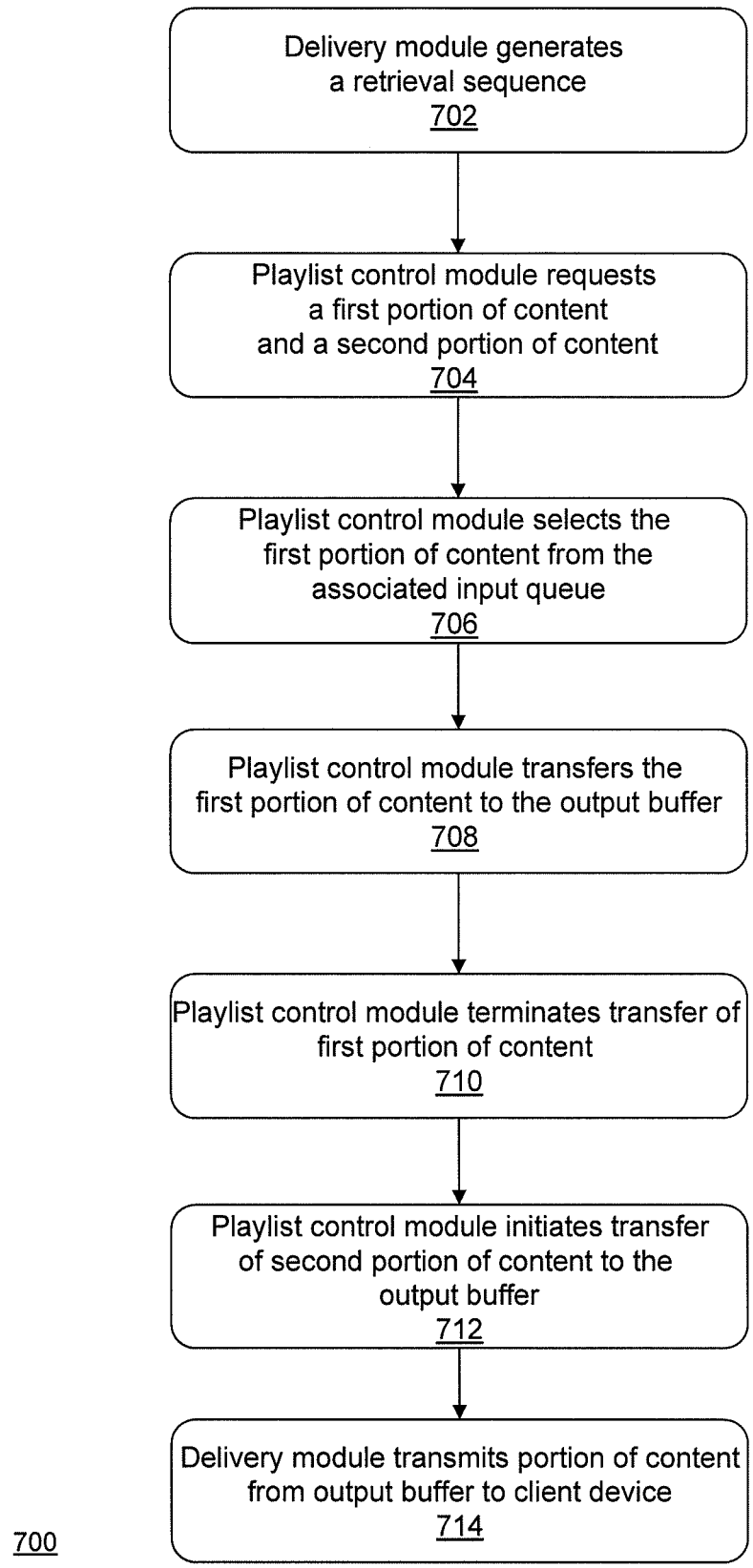
FIG. 7 is a flowchart of an exemplary method for input queued content switching using a playlist.

FIG. 7 is a flowchart of an exemplary method for input queued content switching using a playlist. FIG. 7 is described using the system 600 of FIG. 6. The playlist creation module 604 in the delivery module 210 generates (702) a retrieval sequence (also referred to as a playlist) using one or more requests received from a client device 230. The retrieval sequence can be a data structure. The requests are received using a signaling session that is set up between the client device 230 and the delivery module 210 via the session control module 602. In generating the retrieval sequence, the playlist creation module 604 uses content requests based on content location information 606. The playlist creation module 604 generates a plurality of retrieval entries based on each content request. The retrieval entries are inserted into the retrieval sequence. The playlist control module 608 then requests (704) a first portion of content by sending a content request using the retrieval sequence to a first content source (e.g., ingest 204, broadcast buffer 206, storage 208, or proxy). The playlist control module 608 can also request (704) a second portion of content by sending a content request using the retrieval sequence to a second content source (e.g., the storage module 208).

Once the playlist control module 608 has sent content requests to the content sources, the respective content source retrieves the content associated with the content request, typically from content storage (e.g., Flash, Memory, etc.) at the content source, and stores the content in an associated input queue. For example, when a content request is received by the broadcast buffer controller 610a at the broadcast buffer module 206, the requested content is retrieved from the broadcast buffer memory 610b and stored in an input queue 610c associated with the broadcast buffer module 206. A content source can have one or more associated input queues, as represented by Q(0) through Q(m) in FIG. 6.

Using the retrieval sequence, the playlist control module 608 then selects (706) the first portion of content from the associated input queue, and transfers (708) the first portion of content to an output buffer 614 via the switch fabric 502. In some embodiments, a queue scheduler (not shown) may be implemented at the delivery module 210, in addition to the selection provided by the playlist control module 608, in order to control how often an input queue is serviced, e.g., to avoid overfilling the output buffer. The playlist control module 608 can also observe the content the system 600 transfers from the input queues (e.g., 610c, 612c) to the output buffer 614 using feedback communication path 616. The playlist control module 608 can use information—for example an indicator or a flag—existing in the content to insert control information into the output buffer 614, as described in greater detail below. The control information can be used by the playlist control module 608 to control when content requests are issued and when content retrieval requests should be made (e.g., at playlist request boundaries a different input queue selection may be made). Generally, the playlist control module 608 controls the transfer of the selected portion of content to the "tail" of the output buffer 614, while the network interface module 620 reads content from the "head" of the output buffer 614 for transmittal to a client device 230. In some examples, the delivery module 210 may employ an output scheduler (not shown) to control how often data is read from the output buffer 614 and sent to a client device 230. This may be done at a constant rate, a variable rate, etc. An example of using a rate might occur when transmitting content using a CBR video stream to a STB. The delivery module 210 can then transmit (714) the content from the output buffer 614 to a client device 230.

The playlist control module 608 utilizes the retrieval sequence to control the order in which content requests are sent to the content sources and the order in which selections and transfers of content are made from associated input queues. In some examples, the playlist control module 608 can generate one retrieval sequence for each content stream the delivery module 210 generates. The retrieval sequence may contain one or more retrieval entries, and a content access delay may be determined for each retrieval entry. The content access delay can be based on the access latency associated with retrieving content from the various content sources. For example, a storage module 206 (e.g., Flash memory) may have a longer access latency than a broadcast buffer module 204. Based on the content access delay, the playlist control module 608 can determine a content request time for each retrieval entry in the retrieval sequence. In addition to the latency of the content source, the content request time can be based on considerations such as, among others, the length or size of the requested content or the type of the requested content. As a result, a content request may be made to the storage module 206 before a content request is made to the broadcast buffer module 204 even though the playlist control module 608 may select and transfer the requested content from the broadcast buffer module 204 before selecting and transferring the requested content from the storage module 206. This allows content to be available in an input queue at the time the content is needed for selection and transfer by the playlist control module 608. Also, the content request time can apply to content retrieval requests, resulting in the playlist control module 608 transferring content from the input queues of the respective content sources to the output buffer 614 in a FIFO manner.

While delivering the content, the delivery module 210 switches from retrieving content from the first content source to retrieving content from the second content source (e.g., to insert a localized advertisement). Using the retrieval sequence, the playlist control module 608 can terminate (710) the transfer of the first portion of content and initiate (712) transfer of the second portion of content by selecting the second portion of content from an input queue associated with the second content source. For example, the playlist control module 608 can initiate transfer of content (e.g., a live broadcast) from an input queue 610c associated with the broadcast buffer module 206. The playlist control module 608 uses the retrieval sequence to determine that a switch is to be made to select and transfer content (e.g., an advertisement) from the storage module 208 in place of content from the broadcast buffer module 206. The playlist control module 608 stops the transfer of the broadcast buffer 206 content, selects content from an input queue 612c at the storage module 208, and begins the transfer of content from the input queue 612c to the output buffer 614. In some examples, when the playlist control module 208 finishes the transfer of the second portion of content, the module 208 can again select content from the first content source 206 and initiate transfer of the selected content to the output buffer 614.

FIG. 8A is a diagram of an exemplary content request format 800. The format includes the content location 802 (e.g., the location of the content that is to be queued), the content length 804 (e.g., how much content to queue), and the input queue 806 into which the content is queued. The format 800 also includes playlist control flow information, specifically a jump length 808 and a test control field 810. A non-zero jump length 808 indicates that the next (n) playlist commands in the list should be jumped over if the current content request is executed as part of the retrieval sequence. A zero jump length 808 means no requests are jumped over and the next request in sequence is executed. The test control field 810 may contain one or more bits that affect the control flow. For example, if a particular condition is true then the command may be executed or ignored. This enables conditional execution of playlist commands, as described in greater detail below, which provides an ability to provide different control paths based on tested conditions.

FIG. 8B is a diagram of an exemplary content retrieval request format 850. The format 850 includes an input queue identifier 806, which identifies the input queue (e.g., Q(0) 612c) from which the content will be selected as well as playlist control flow information, such as the jump length 808 and a conditional control test field—in this example, a skip-on-empty (SoE) control bit 812 is shown. A non-zero jump length 808 indicates that the next (n) playlist commands in the list should be jumped. The SoE bit 812 in this example might indicate that this command should be skipped if an input queue is empty at a predetermined time that such identified queue needs to be accessed, as described in greater detail below. Other control bits (not shown) may also be used to conditionally alter the sequence of the playlist as well.

Figure 9:
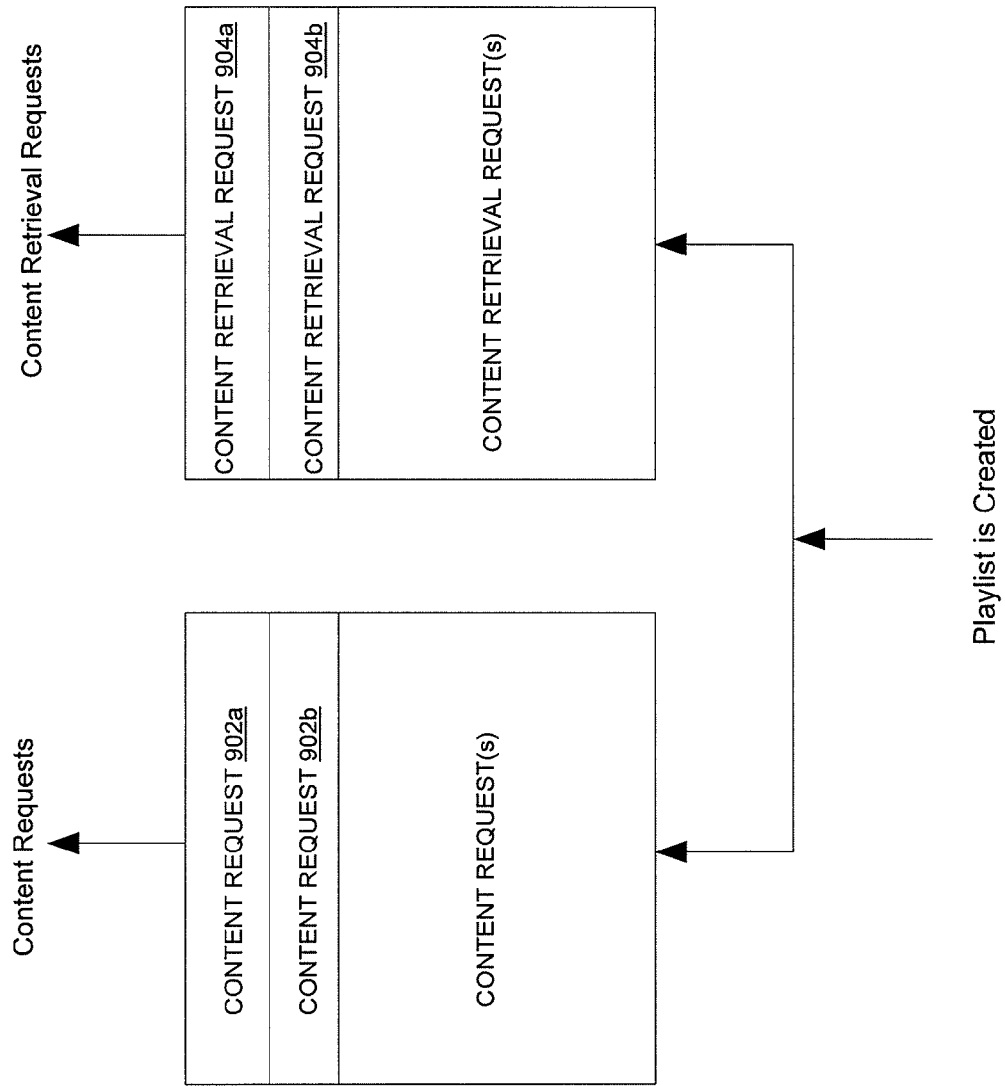
FIG. 9 is a diagram of an exemplary retrieval sequence format.

FIG. 9 is a diagram of an exemplary retrieval sequence format 900. The retrieval sequence can include a plurality of retrieval entries, including both content requests 902a-b and content retrieval requests 904a-b. Each retrieval sequence may be a different size and contain a different number of retrieval entries for both content requests 902a-b and content retrieval requests 904a-b. For example, many content requests 902a-b may be made to the same content source where only a single input queue is used. The content retrieval requests 904a-b associated with a single content device may be identified sequentially when inserted into the retrieval sequence or the content retrieval requests for all content devices (e.g., 204, 206, 208, 504) may be identified sequentially when inserted into the retrieval sequence. The playlist control module 602 uses the content retrieval requests 904a-b to determine from which input queue to select content, with the selection order determined by the retrieval sequence. In some examples, content requests 902a-b and content retrieval requests 904a-b are decoupled from each other in the retrieval sequence, although each is executed sequentially. The content requests 902a-b may be taken from the retrieval sequence and sent as quickly as possible to the respective content devices, or the content requests 902a-b may be sent out at a rate that is determined by the respective content devices' ability to receive requests. Generally, the playlist control module 608 takes content retrieval requests 904a-b from the retrieval sequence at a different time that the corresponding content requests 902a-b, although this is not necessary. For example, the playlist control module 608 may take a content request (e.g., 902a) from the retrieval sequence and send the content request to a content source before the corresponding content retrieval request (e.g., 904a) is taken from the retrieval sequence. This allows the playlist control module 608 to account for different content access delays and other content processing delays.

Figure 10:
FIG. 10 is a diagram of an exemplary output stream generated by a playlist.

FIG. 10 is a diagram of an exemplary output stream 1000 generated by a retrieval sequence. The diagram shows how the playlist control module 608 selects content from one or more input queues and then transfers that content in sequence to the output buffer 614. For example, when the playlist control module 608 observes each end of content 1004a-b via the content observation communication path 616 as the content is transferred to the output buffer 614, the playlist control module 608 issues a new content retrieval request to select content from a different input queue, the input queue potentially located on a different content source. It is noted that in some examples, the playlist control module 608 does not wait until the end of content to request the next content, but instead makes the request slightly before the end of the content. This advantageously accounts for delays for processing and transmission (e.g., across the switch fabric 502) so that there are no gaps between two portions of content (e.g., between content (0) and content(1)). The playlist control module 608 determines the order and amount of content placed in the output buffer 614 by the retrieval sequence. In some examples, the playlist control module 608 can request portions of content from different content locations on the same content source, and the portions of content can share the same input queue. As a result, the playlist control module 608 does not need to switch between input queues to select content because each content request indicates what content to read and how much. In other examples, different portions of content from the same content source can be queued to different input queues of that content source so that the content can be selected by selecting the different input queues when necessary.

Figure 11:
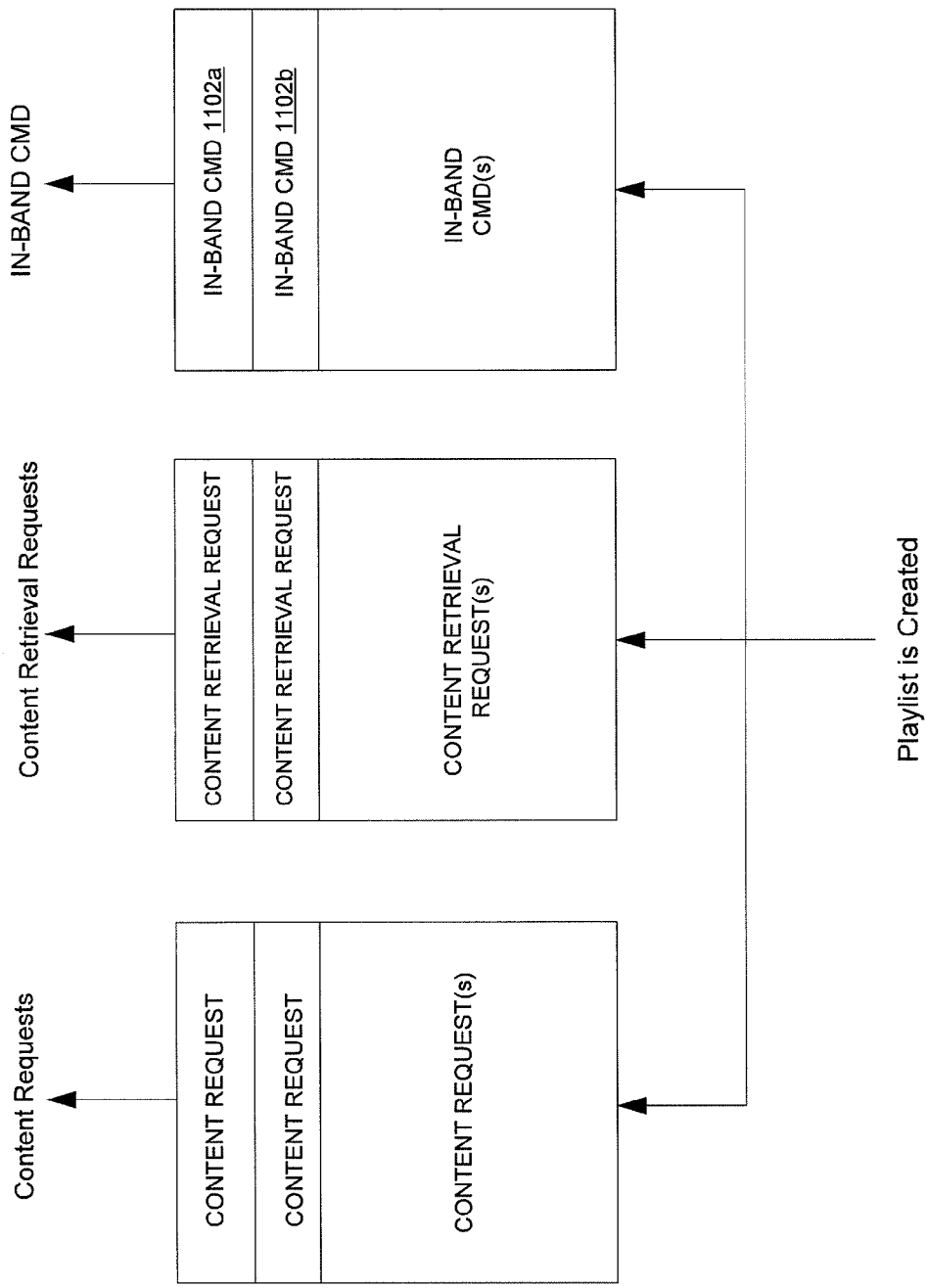
FIG. 11 is a diagram of an exemplary playlist format including in-band commands.

In addition to using a retrieval sequence to control both the order in which content requests are sent and the timing of content retrieval requests, the retrieval sequence may also be used to insert in-band commands into the content stream. The playlist control module 608 may insert in-band commands, for example, to signal a downstream device that some action needs to be taken, such as inserting some number of MPEG-2 TS Null packets as indicated by the command. Similar to how content selection is performed, an in-band command may be inserted at content selection boundaries based on some indicator in the content (e.g., flags or markers). FIG. 11 is a diagram of an exemplary retrieval sequence format 1100 including in-band commands (CMD) 1102a-b. For example, each time the playlist control module 608 observes a particular indicator in the selected content via the content observation link 616, the playlist control module 608 may take an in-band command 1102a-b from the retrieval sequence and insert the command 1102a-b sequentially into the output buffer 614. The commands 1102a-b can be inserted independently of the content requests and content retrieval requests that the playlist control module 608 also uses.

Figure 12:
FIG. 12 is a diagram of an exemplary output stream generated by a playlist including in-band commands.

FIG. 12 is a diagram of an exemplary output stream 1200 generated by a retrieval sequence including in-band commands. The diagram shows how the playlist control module 608 selects a portion of content 1206 from an input queue, transfers that content 1206 in sequence to the output buffer 614, and inserts an in-band commands 1208 between the portions of content 1206 and 1210. For example, when the playlist control module 608 observes each end of content 1204a-b via the content observation path 616 as the content 1206 is transferred to the output buffer 614, the playlist control module 608 inserts an in-band command 1208 into the output buffer 614 before switching to select content 1210 from a different input queue. The playlist control module 608 determines the order and amount of content and in-band commands placed in the output buffer 614 by the retrieval sequence.

Once the playlist control module 608 transfers content and in-band commands to the output buffer 614, the output buffer 614 processes the content for delivery to a client device 230. The processing can include transmitting the content across a communications network to a client device 230. The processing can also include execution of the inserted in-band commands, for example, to instruct a downstream device to further process the content stream before that content reaches the client device 230.

Generally, content switching between different devices of varying access latency can open the possibility that content may not always be available in time for the playlist control module 608 to select and transfer the content to the output buffer 614. For example, switching from a live broadcast stream in a fast memory device (e.g., a broadcast buffer 204) to content stored in a slower access technology (e.g., a storage module 206) may lead to such a problem, especially if the content request cannot be made far enough in advance of needing the content. One embodiment of this problem is ad splicing applications where the advertisement may be stored on a separate storage system (e.g., an ad server) and there is the possibility that the ad content may not be available quickly enough to successfully complete a splicing operation. This is partly due to the notification that a splice point is coming is usually embedded in the live broadcast stream (e.g., using SCTE 35 Cue Messages), and there is a countdown (e.g., 4 seconds) to the actual splicing point. The video delivery system 200 needs to detect the splicing message in the stream, determine which ad to place in the spot, retrieve the ad from storage (e.g., storage module 208), and then perform the splicing operation within the countdown time.

Normally, an ad splicer would have both the advertisement from storage (e.g., storage module 208) and the live broadcast feed (e.g., from a broadcast buffer 206) available at inputs from which the ad splicer could select content. In the case of an advertisement not being available quickly enough, the splicer would simply continue to select the live content feed without inserting the stored content. However, the video delivery system 200 performs ad splicing on delivery by using a playlist to access the live content and the advertisement in sequence. The use of a playlist in this example can avoid needing both the live and stored sources of content in parallel at delivery, possibly doubling its input bandwidth requirement. Also, the use of a playlist in this example can reduce the output buffering requirements of the delivery module 210 (e.g., by not having to store twice the content streams being delivered to client devices 230).

In some examples, the video delivery system 200 uses a composite playlist containing multiple playlist sequences that are selected conditionally based on a test. For example, the playlist creation module 604 generates a composite playlist that contains a first and second playlist. In the case of a missed ad, the input queue (e.g., input queue 612c) that would have contained the ad content might be empty, signaling that the first playlist should be skipped and a second playlist used instead. In some examples, the second playlist contains a conditional switch back to the live content and the playlist control module 608 selects a substitute input queue (e.g., input queue 610c) with the live content so that the subscriber watching at a client device 230 sees an uninterrupted video stream. The playlist control module 608 may also send a content request to a content source before the time of the conditional switch, or at the time of the conditional switch, depending on the access latency of the content device. In the case of switching back to a live stream in a fast memory (e.g., broadcast buffer 206), the playlist control module 608 can send the content request at the time of the condition test. If the latency is large, the playlist control module 608 may need to send a content request far enough in advance of the condition test so that the substitute content is preloaded in an input queue (e.g., 612c), thereby allowing the conditional switch to be made at the playlist control module 608 by selecting the preloaded input queue (e.g., 612c).

The playlist control module 608 can make a conditional switch between two input queues based on the fullness of a queue—for example, whether the queue is empty or contains content. If the playlist control module 608 determines that a second portion of content is unavailable in the input queue associated with the second content source, then the playlist control module 608 would not select content based on the first playlist and instead select content based on the second playlist. The video delivery system 200 can return to selecting content from the input queue containing the first portion of content, which remains at the last position of a previous selection, or the system 200 can select content from another input queue containing a third portion of content (e.g., a preloaded input queue) that has been made available for splicing, so that something is placed in the spot. In some examples, the conditional control flow of the content requests and the content retrieval requests may be independent of one another or coupled together. They may also be decoupled in time, such that different tests are made at different times and the control paths indicated are taken at those times. A conditional control path may be implemented on one or more playlist components, including commands that are inserted into the content stream.

Figure 13:
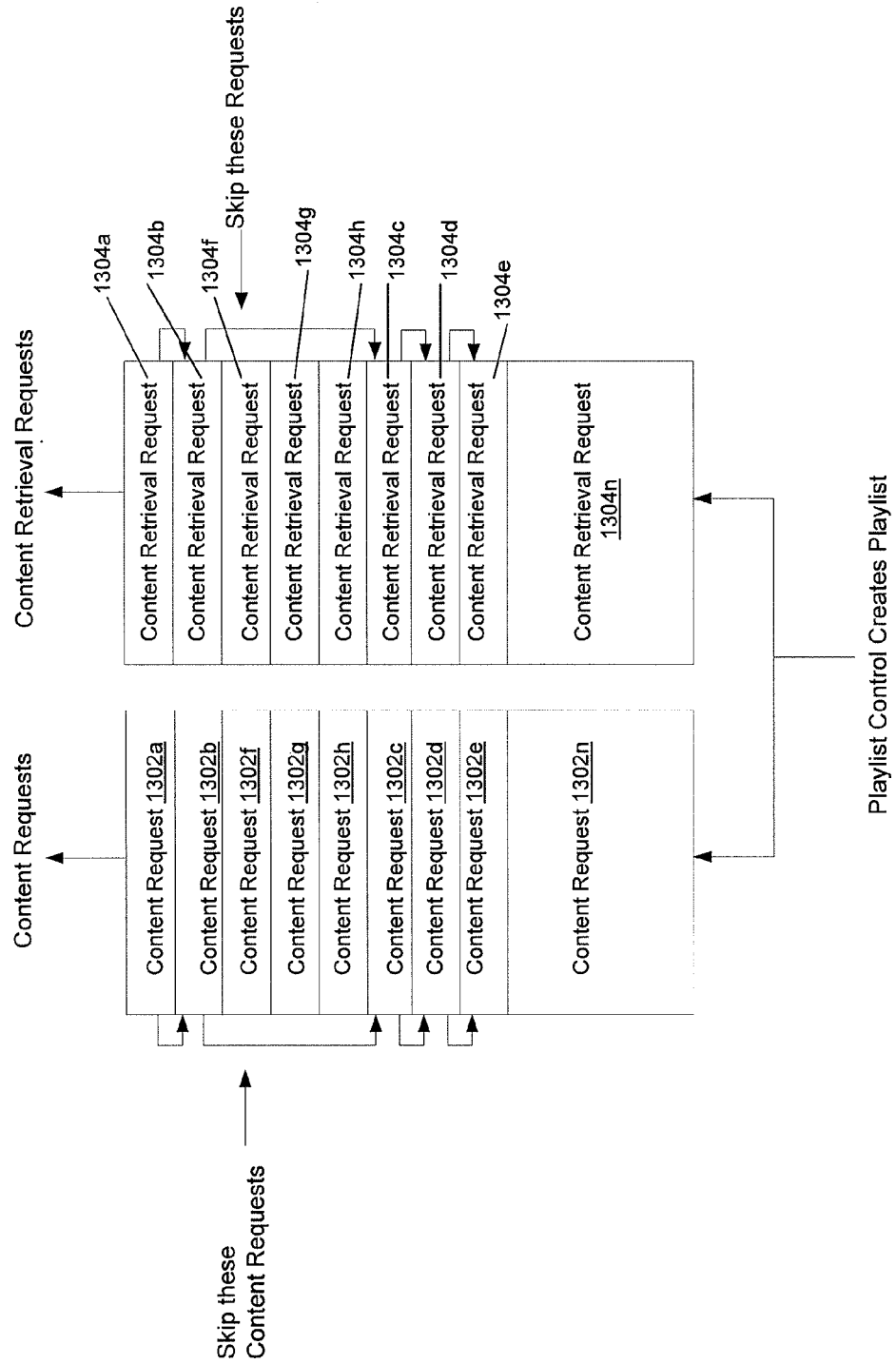
FIG. 13 is a diagram of an exemplary conditional composite playlist where the requested content is ready.

FIG. 13 is a diagram of an exemplary conditional composite playlist 1300 where the requested second portion of content is available in the input queue associated with the second content source. In this example, both content requests and content retrieval requests respond to similar test conditions, such as determining whether an input queue is empty when accessed. When the requested second portion of content is available, for example, the conditional test may return a false value. In this example, the second portion of content is available, so the playlist control module 608 requests and selects content using a first playlist comprising content requests 1302a, 1302b, 1302c, 1302d, 1302e and content retrieval requests 1304a, 1304b, 1304c, 1304d, and 1304e, and skips a second conditional playlist comprising content requests 1302f, 1302g, 1302h and content retrieval requests 1304f, 1304g, and 1304h. For example, the playlist control module 608 sends content requests 1302a and 1302b in sequence. The Jump Length 808 in content request 1302b has a value of 3, causing the playlist control module 608 to jump over the second conditional playlist since the content requests 1302f, 1302g, and 1302h and content retrieval requests 1304f, 1304g, and 1304h corresponding to the second playlist are the next three entries in the sequence. The playlist control module 608 would then send content request 1302c, 1302d, and 1302e. As a result, the playlist control module 608 would select content based on content retrieval requests 1304a, 1304b, 1304c, 1304d, and 1304e in sequence, skipping content retrieval requests 1304f, 1304g, and 1304h. Likewise, content retrieval request 1304a and 1304b are processed by the playlist control module. Because of the skip in the content requests, the corresponding content retrieval requests 1304f, 1304g, and 1304 h are skipped.

Figure 14:
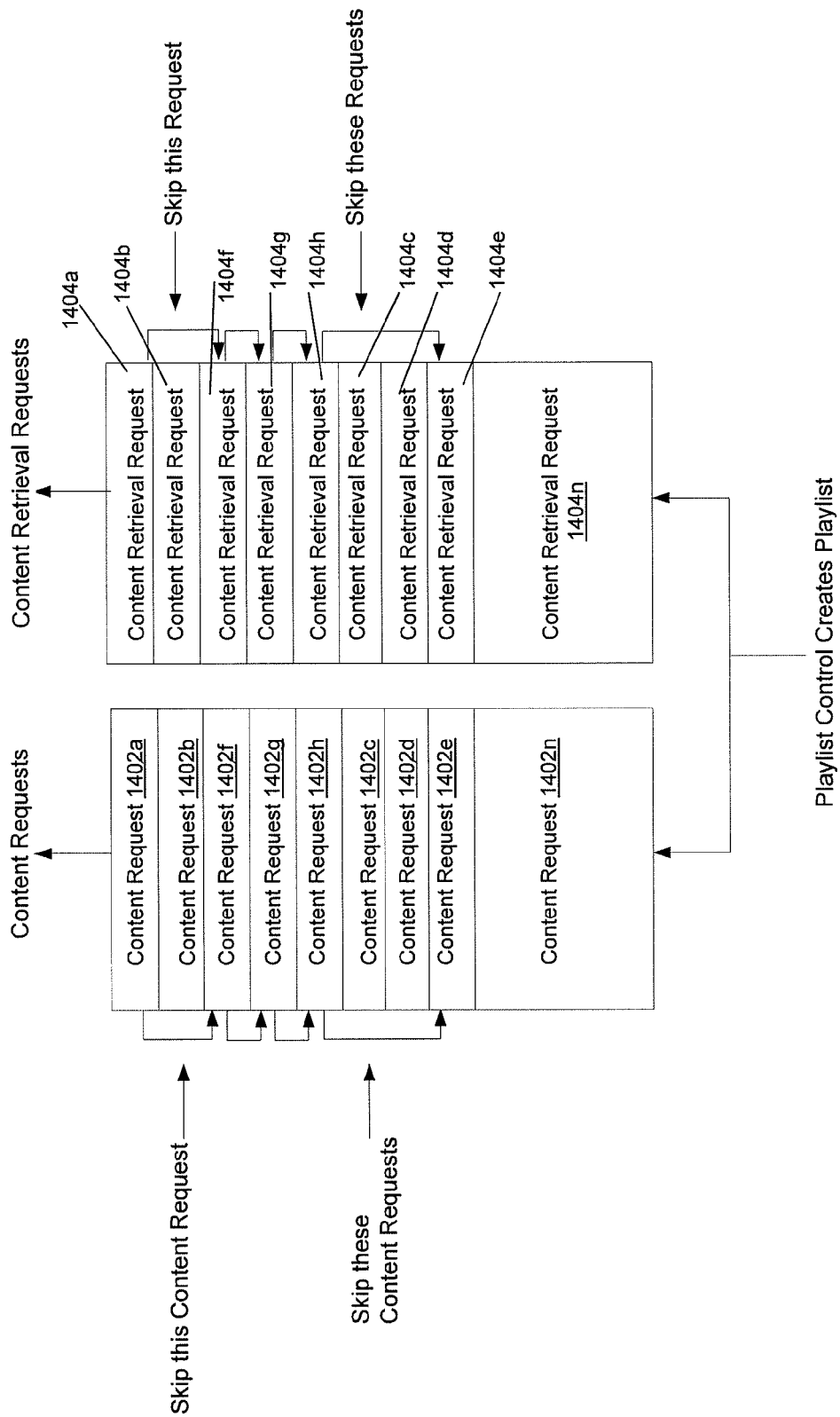
FIG. 14 is a diagram of an exemplary conditional composite playlist where the requested content is not ready

FIG. 14 is a diagram of an exemplary conditional composite playlist 1400 where the requested second portion of content is not available in the input queue associated with the second content source. When the requested second portion of content is not available, for example, the conditional test may return a true value. Since the second portion of content is not available in this example, the playlist control module 608 requests and selects content using a second conditional playlist comprising content requests 1402f, 1402g, 1402h and content retrieval requests 1404f, 1404g, and 1404h, and skips several entries in the first playlist including 1402b, 1402c, and 1402d, and content retrieval requests 1404b, 1404c, and 1404d. In this example, the skip on empty (SoE) bit field 812 is set in content request 1402b and content retrieval request 1404b, causing the playlist control module 608 to test the fullness of the input queue associated with those retrieval entries 1402b and 1404b. When the playlist control module 608 accesses the input queue and determines that the queue does not contain the requested portion of content, the playlist control module 608 skips the retrieval entries 1402b and 1404b. The playlist control module 608 then moves to the next entry 1402f in sequence since the jump length is ignored in the entries that are not executed. In this example, the content request 1402h and content retrieval request 1404h contain a jump length of 2, causing the playlist control module 608 to jump over additional entries 1402c, 1402d, 1404c, and 1404d. Specifically, the playlist control module 608 sends content requests 1402a, 1402f, 1402g, 1402h, and 1402e in sequence, while the module 608 skips content requests 1402b, 1402c, and 1402d. Accordingly, the module 608 selects content based on content retrieval requests 1404a, 1404f, 1404g, 1404h, and 1404e in sequence, while the module 608 skips content retrieval requests 1404b, 1404c, and 1404d.

The above-described systems and methods can be implemented in digital electronic circuitry, in computer hardware, firmware, and/or software. The implementation can be as a computer program product (i.e., a computer program tangibly embodied in a computer-readable storage device). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose circuitry. The circuitry can, for example, be a FPGA (field programmable gate array), an ASIC (application-specific integrated circuit), or the like. Modules refer to portions of the hardware (e.g., the processor, processor and memory, the special circuitry and the like), including the software elements (e.g., computer program), that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more computer readable storage devices for storing data (e.g., magnetic, magneto-optical disks, or optical disks).

Data transmission and instructions can also occur over a communications network. Information carriers suitable for embodying computer program instructions and data include computer readable storage mediums, for example all forms of non-volatile memory, including by way of example semiconductor memory devices. The computer readable storage mediums can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a World Wide Web browser (e.g., Microsoft® Internet Explorer® available from Microsoft® Corporation, Mozilla® Firefox available from Mozilla® Corporation). The mobile computing device includes, for example, a Blackberry®.

The web servers can be, for example, a computer with a server module (e.g., Microsoft® Internet Information Services available from Microsoft® Corporation, Apache Web Server available from Apache Software Foundation, Apache Tomcat Web Server available from Apache Software Foundation).

The databases can be, for example, a computer with a server module (e.g., Microsoft® SQL Server 2008 available from Microsoft® Corporation and/or Oracle® Database 11g available from Oracle® Corporation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communications networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computerized method for input queued content switching across different content types, the method comprising:
   generating, by a first computing device, a retrieval sequence using a plurality of content requests, the content requests being based on content location information;
   requesting, by the first computing device, content of a first type to be queued at a first content source and content of a second type to be queued at a second content source using the retrieval sequence;

generating, at the first computing device, a content stream of the content of the first type, the content of the second type, and proxy content, the generating comprising:
selecting the content of the first type from a queue associated with the first content source using the retrieval sequence,
transferring the content of the first type from the queue associated with the first content source to an output buffer,
terminating transfer of the content of the first type from the queue associated with the first content source to the output buffer, and initiating transfer of the content of the second type from a queue associated with the second content source to the output buffer, by selecting the content of the second type from the queue associated with the second content source using the retrieval sequence;
selecting the proxy content from a proxy content source using the retrieval sequence and transferring the proxy content to the output buffer without first storing the proxy content in a storage module, when the content of the second type is unavailable in the queue associated with the second content source; and
transmitting the content of the first type and the content of the second type in the output buffer to a client device when the content of the second type is available; and
transmitting the content of the first type and the proxy content in the output buffer to the client device when the content of the second type is unavailable.

2. The method of claim 1, wherein the generating a retrieval sequence comprises:
generating a plurality of retrieval entries based on each content request;
inserting the retrieval entries into the retrieval sequence.

3. The method of claim 2, further comprising:
determining, by the first computing device, a content access delay for each retrieval entry; and
determining, by the first computing device, a content request time based on the content access delay.

4. The method of claim 3, wherein the content request time is based on content type, content length, content source, a temporal value, or any combination thereof.

5. The method of claim 1, wherein the requesting comprises:
sending a first content retrieval request to the first content source and a second content retrieval request to the second content source.

6. The method of claim 1, wherein the content of the second type is unavailable in the queue associated with the second content source and the proxy content is unavailable at the proxy content source, the generating step further comprising:
selecting substitute content of the first type or the second type from a queue associated with a third content source using the retrieval sequence; and
transferring the substitute content to the output buffer.

7. The method of claim 6, wherein the first content source and the third content source are the same.

8. The method of claim 1, wherein the content requests are based on session control information.

9. The method of claim 1, wherein the content requests are based on a request from the client device.

10. The method of claim 1, further comprising:
processing, by the first computing device, the transferred content of the first type to determine the existence of an indicator.

11. The method of claim 10, further comprising:
inserting, by the first computing device, control information into the output buffer based on the indicator.

12. The method of claim 1, wherein the content location information includes a primary content source, a proxy content source, or any combination thereof.

13. The method of claim 1, wherein the output buffer is a first-in first-out buffer.

14. The method of claim 1, wherein the output buffer includes content delivery processing.

15. The method of claim 1, wherein the first content source, the second content source, and the first computing device are connected by a switch fabric.

16. The method of claim 1, wherein the retrieval sequence is a data structure.

17. A computer program product, tangibly embodied in a machine-readable storage device, for input queued content switching across different content types, the computer program product including instructions operable to cause a server computing device to:
generate a retrieval sequence using a plurality of content requests, the content requests being based on content location information;
request content of a first type to be queued at a first content source and content of a second type to be queued at a second content source using the retrieval sequence;
generate a content stream of the content of the first type, the content of the second type, and proxy content, the generating comprising:
selecting the content of the first type from a queue associated with the first content source using the retrieval sequence,
transferring the content of the first type from the queue associated with the first content source to an output buffer,
terminating transfer of the content of the first type from the queue associated with the first content source to the output buffer, and initiating transfer of the content of the second type from a queue associated with the second content source to the output buffer, by selecting the content of the second type from the queue associated with the second content source using the retrieval sequence;
selecting the proxy content from a proxy content source using the retrieval sequence and transferring the proxy content to the output buffer without first storing the proxy content in a storage module, when the content of the second type is unavailable in the queue associated with the second content source; and
transmit the content of the first type and the content of the second type in the output buffer to a client device when the content of the second type is available; and
transmit the content of the first type and the proxy content in the output buffer to the client device when the content of the second type is unavailable.

18. A system for input queued content switching across different content types, the system comprising:
a content request processor configured to:
generate a retrieval sequence using a plurality of content requests, the content requests being based on content location information,
request content of a first type to be queued at a first content source and content of a second type to be queued at a second content source using the retrieval sequence;

and
a content retrieval processor configured to:
  generate a content stream of the content of the first type, the content of the second type, and proxy content, the generating comprising:
    selecting the content of the first type from a queue associated with the first content source using the retrieval sequence,
    transferring the content of the first type from the queue associated with the first content source to an output buffer,
    terminating transfer of the content of the first type from the queue associated with the first content source to the output buffer, and initiating transfer of the content of the second type from a queue associated with the second content source to the output buffer, by selecting the content of the second type from the queue associated with the second content source using the retrieval sequence;
    selecting the proxy content from a proxy content source using the retrieval sequence and transferring the proxy content to the output buffer without first storing the proxy content in a storage module, when the content of the second type is unavailable in the queue associated with the second content source; and
  transmit the content of the first type and the content of the second type in the output buffer to a client device when the content of the second type is available; and
  transmit the content of the first type and the proxy content in the output buffer to the client device when the content of the second type is unavailable.

19. A system for input queued content switching across different content types, the system comprising:
  means for generating a retrieval sequence using a plurality of content requests, the content requests being based on content location information;
  means for requesting content of a first type to be queued at a first content source, content of a second type to be queued at a second content source using the retrieval sequence;
  means for generating a content stream of the content of the first type, the content of the second type, and proxy content, the generating comprising:
    selecting the content of the first type from a queue associated with the first content source using the retrieval sequence,
    transferring the content of the first type from the queue associated with the first content source to an output buffer,
    terminating transfer of the content of the first type from the queue associated with the first content source to the output buffer, and initiating transfer of the content of the second type from a queue associated with the second content source to the output buffer, by selecting the content of the second type from the queue associated with the second content source using the retrieval sequence;
    selecting the proxy content from a proxy content source using the retrieval sequence and transferring the proxy content to the output buffer without first storing the proxy content in a storage module, when the content of the second type is unavailable in the queue associated with the second content source; and
  means for transmitting the content of the first type and the content of the second type in the output buffer to a client device when the content of the second type is available; and
  means for transmitting the content of the first type and the proxy content in the output buffer to the client device when the content of the second type is unavailable.

20. The method of claim 1, wherein the content of the first type is live content and the content of the second type is stored content.

\* \* \* \* \*